(12) United States Patent
Zhevago (10) Patent No.: US 10,928,005 B2
(45) Date of Patent: Feb. 23, 2021

(54) MULTICAPILLARY SYSTEM FOR STORING FUEL GASES

(71) Applicant: H2-ENERGY LIMITED LIABILITY COMPANY, Moscow (RU)

(72) Inventor: Nikolaj Konstantinovich Zhevago, Moscow (RU)

(73) Assignee: H2-ENERGY LIMITED LIABILITY COMPANY, Moscow (RU)

( * ) Notice: Subject to any disclaimer, the term of this patent is extended or adjusted under 35 U.S.C. 154(b) by 0 days.

(21) Appl. No.: 16/750,573

(22) Filed: Jan. 23, 2020

(65) Prior Publication Data

US 2020/0158285 A1 May 21, 2020

Related U.S. Application Data

(63) Continuation of application No. PCT/RU2018/000495, filed on Jul. 25, 2018.

(30) Foreign Application Priority Data

Jul. 28, 2017 (RU) .......................... RU2017127195

(51) Int. Cl.
F17C 1/00 (2006.01)

(52) U.S. Cl.
CPC ........ *F17C 1/00* (2013.01); *F17C 2201/0166* (2013.01); *F17C 2203/0634* (2013.01); *F17C 2221/012* (2013.01); *F17C 2270/0184* (2013.01)

(58) Field of Classification Search
CPC .................. F17C 2221/012; F17C 1/00; F17C 2205/0142; F17C 2201/0104;

(Continued)

(56) References Cited

U.S. PATENT DOCUMENTS 5,830,400 A * 11/1998 Huvey ..................... F16J 12/00
  264/254
8,479,487 B2 7/2013 Ku et al.
(Continued)

FOREIGN PATENT DOCUMENTS

DE   10343250 A1   5/2004
EP    2062850 A2   5/2009
(Continued)

OTHER PUBLICATIONS

Gupta R., Basile A., Veziroglu T.N. (ed.), "Compendium of Hydrogen Energy: Hydrogen Storage, Distribution and Infrastructure", Woodhead Publishing, 2016.
(Continued)

*Primary Examiner* — Imran Akram
(74) *Attorney, Agent, or Firm* — BCF LLP (57) ABSTRACT

Disclosed is a gas storage, preferably of hydrogen, and is in the form of a multi-capillary structure. The multi-capillary structure has a constant section over a certain length, which section then reduces sharply, down to a value at which the multi-capillaries become sufficiently flexible. The area of flexibility of the multi-capillaries has a length sufficient for the transportation of hydrogen to a fuel element. In this way, a flexible multi-capillary gas pipeline is created, which pipeline is integrated with a volume of stored hydrogen, the function of which pipeline is to supply hydrogen to the fuel element. The technical result consists of the provision of rapid priming of a micro-capillary vessel with high pressure gas and the regulated release of the gas from the vessel into a collector, where a moderate pressure (<1 MPa), required for operation of the fuel element, is maintained.

8 Claims, 5 Drawing Sheets

(58) Field of Classification Search
CPC ...... F17C 2203/0658; F17C 2203/0673; F17C 2201/0138; Y02E 60/321
See application file for complete search history.

(56) References Cited

U.S. PATENT DOCUMENTS

| | | | |
|---|---|---|---|
| 2006/0163752 A1* | 7/2006 | Wang | B01D 63/08 257/794 |
| 2009/0120811 A1 | 5/2009 | Zhevago et al. | |
| 2010/0059528 A1* | 3/2010 | Zhevago | F17C 1/00 220/592 |
| 2011/0030383 A1 | 2/2011 | Ku et al. | |
| 2013/0186904 A1 | 7/2013 | Tessier et al. | |
| 2013/0299503 A1* | 11/2013 | Griffith | B60K 15/03006 220/581 |
| 2015/0236362 A1 | 8/2015 | Stern et al. | |
| 2017/0219251 A1* | 8/2017 | Kuckelkorn | F24S 10/45 |
| 2017/0276891 A1* | 9/2017 | Esseghir | H01B 13/14 |
| 2018/0240570 A1* | 8/2018 | Esseghir | H01B 7/28 |

FOREIGN PATENT DOCUMENTS

| | | | |
|---|---|---|---|
| EP | 2163805 A2 | 3/2010 | |
| KR | 1020040044737 B1 * | 9/2006 | ............ C01B 33/12 |
| RU | 2327078 C2 | 6/2008 | |
| RU | 2339870 C1 | 11/2008 | |
| RU | 123106 U1 | 12/2012 | |
| RU | 158382 U1 | 12/2015 | |
| RU | 2616140 C1 | 4/2017 | |

OTHER PUBLICATIONS

Zhevago N.K., Denisov E.I., Glebov V.I., "Experimental investigation of hydrogen storage in capillary arrays", International Journal of hydrogen energy, 2010, v. 35, pp. 169-175.

Zhevago N.K. and others, "Micro-capillary hydrogen storage tanks", International Scientific Journal Alternative Energy and Ecology—2012.—N° 9.—p. 106-115.

* cited by examiner

MULTICAPILLARY SYSTEM FOR STORING FUEL GASES

CROSS-REFERENCE

The present application is a Continuation of International Application No. PCT/RU2018/000495, filed on Jul. 25, 2018, entitled "SYSTEM FOR THE STORAGE OF FUEL GASES", which claims priority to Russian Patent Application No. 2017127195, filed on Jul. 28, 2017, the entirety of which is incorporated herein by reference.

FIELD OF THE INVENTION

The invention relates to the field of storage of gases under high pressure. More precisely, the invention relates to compact and light storage of gases such as hydrogen and methane. The invention can find application in the field of engines, in particularly automotive, in which catalytic reactions of fuel gases with oxygen in fuel cells are used to generate electricity.

BACKGROUND

Currently, the most common sources of electrical energy for mobile electronics and unmanned aerial vehicles are nickel-polymer or lithium-polymer batteries. The best lithium-polymer batteries have a specific energy consumption of about 200 Wh per one kilogram of a battery weight, at the total capacity 20 Ah, which limits the device operation time without recharging the battery. For a significant increase in the energy consumption of the mobile power plant, fuel cells are used. In a fuel cell, hydrogen, coming from the storage, enters into a catalytic reaction with an oxidizing agent, because of which electricity is produced. The most common fuel gas for fuel cells is hydrogen, and air oxygen is used as an oxidizing agent, which produces water, thermal energy and electrical energy. However, other fuels, e.g. natural gas, can be used in fuel cells.

One of the problems faced by hydrogen energy is the safe storage and regulated supply of hydrogen fuel to the fuel cell. Various methods have been developed for mobile storage of hydrogen in steel or composite cylinders, including physical storage methods (in liquid, compressed or adsorbed by porous structures) and chemical storage methods (metal hydrides). All these methods have significant limitations on the gravimetric and volumetric content of hydrogen in the fuel storage and supply system (Gupta R., Basile A., Veziroglu T. N. (ed.), Compendium of Hydrogen Energy: Hydrogen Storage, Distribution and Infrastructure—Woodhead Publishing, 2016).

A more promising is the use of storage facilities based on micro-capillary structures. It is known that capillary containers of high-strength glass grades are a practical alternative to existing cylinders of steel and composite materials for the storage and transportation of compressed fuel gases. According to the available experimental data (Zhevago N. K., Denisov E. I., Glebov V. I., International Journal of hydrogen energy, 2010, v. 35, pp. 169-175), micro-capillaries of glass can be used for the safe storage of hydrogen and other gases at pressures significantly higher (100 MPa and more) than in standard (20-35 MPa) and composite (35-70 MPa) cylinders, thus providing a record gravimetric content of gases in them. Since the total volume of gas, stored in a multi-capillary container, is divided into many small volumes, corresponding to the number of micro-capillaries, the probability of instantaneous release of large amounts of gas into the atmosphere during emergency destruction of the part of the container decreases, thereby increasing the safety of storing hydrogen gas under high pressure.

Multi-capillary containers (tanks) have other advantages as well. Unlike conventional high-pressure gas cylinders, which, for reasons of strength, have the shape of a circular cylinder or sphere, multi-capillary containers may take an arbitrary shape (hex, flat, etc.). As a result, they can use any hollow space of an apparatus that uses fuel cells to generate electricity. Another important property of glass capillaries with a diameter of less than 200 microns is their high mechanical flexibility. For this reason, a bundle of flexible capillaries can be used as a pipeline, for example, connecting the main volume of the high-pressure gas storage with the fuel cell. In this case turning the gas flow, if necessary, does not require connecting sleeves (Zhevago N. K. and others, Micro-capillary hydrogen storage tanks, International Scientific Journal Alternative Energy and Ecology—2012.—No. 9.—P. 106-115). Bundles of flexible capillaries can find many other applications, not only in the field of storage and transportation of fuel gases. Particularly, they were proposed for the distribution of breathing gases to passengers of airplanes in emergencies (DE 10343250 A1).

For the practical use of fuel gas stored in a multi-capillary tank, it is necessary to provide a quick filling of the tank with gas and controlled release of gas from the tank to the buffer, where moderate pressure (0.1-1.0 MPa) is maintained in order to enable gas flow through the proton membranes of the fuel cell. In the previously proposed designs of multi-capillary vessels to release gas from the capillaries fusible metal layer was used, (patents RU 2327078 C2, RU 2339870 C1) or plugs (US 20090120811 A1, EP 2062850 A3) covering free (not sealed) capillary ends. In them, the release of gas can be carried out by destruction (melting) of the layer or the plugs, respectively. Such an approach is not seen as the most efficient, it is too complicated to regulate, and it requires energy to heat the layers (plugs) that can lead to additional glass tension due to the difference in the coefficients of volumetric expansion of glass and the material of the layers (plugs). Another disadvantage of such solutions is that they do not provide fast filling of the tank with gas and controlled release of gas from the tank to the buffer while ensuring optimum reliability and speed of gas release from the capillaries.

To eliminate thermal effects on capillaries during gas release from the tank to the fuel cell, it was proposed (US20150236362 A1) to glue a plurality of micro-capillaries (cartridges) open at one end into cylindrical protective cylinders, which in turn, with their open end, are integrated into an adapter having a standard hydrogen supply system to fuel cells. In a similar solution scheme (US 2013186904 A1) was proposed to place a bunch of capillaries in a closed container with high pressure space for gas to exit from the capillaries, and to create a gas storage of sufficient volume, a group of containers was proposed connected with pipelines.

At the same time, it can be noted that such a hydrogen supply scheme can be safe if the cross-section of the protective cylinder (container) is small enough. This is because the force of gas pressure at the junction of the cartridge with the cylinder is proportional to the area of its cross section. For example, with a pressure of 100 MPa and an area of only 1 cm2, this force is around 1000 kgf, therefore, a large number of cartridges with moderate cross-section and a large number of connecting elements of cartridges with adapter must be used that makes the system heavier. Another disadvantage is that a useless volume arises between the cartridges and thereby deteriorates the overall volumetric performance of the power plant.

Thus, now the applicant is not aware of a solution that would be satisfactory both in its gravimetric and volumetric characteristics, as well as in terms of safety criteria of use.

There is a need for the further improvement of the equipment for mobile hydrogen storage, in order to provide efficient supply of hydrogen from a multi-capillary storage to a fuel cell. Thus, the task of improving safety and improving the weight and volume characteristics of a power plant is extremely urgent today.

SUMMARY OF INVENTION

The object of the present invention is to overcome the drawbacks of the prior art. More precisely, it is an object of the present invention to provide quick refill of a multi-capillary tank with highly pressurized gas and controlled release of the gas from the multi-capillary tank to the manifold, where the moderate pressure (less than 1 MPa) is maintained for the operation of the fuel cell. It is necessary ensuring optimal safety and efficient gravimetric and volumetric characteristics of a power plant, including a gas storage system and gas transportation to a fuel cell.

The Following Solve the Problem

Multi-capillary gas storage system, including a bundle of micro-capillaries, sealed at one end, characterized in that micro-capillaries are sealed with metal plugs, the space between the micro-capillaries is filled with plastic material, and the micro-capillaries are cylindrical in shape and have a constant cross-section near closed ends, which closer to the open ends decreases to the value at which micro-capillaries become flexible and forming a flexible gas pipeline.

Multi-capillary gas storage system, including a bundle of micro-capillaries, sealed at one end, characterized in that the micro-capillaries are sealed with metal plugs, the micro-capillaries are made in the form of six-sided prismatic capillaries with common interfaces, while the outer faces of the peripheral capillaries are cylindrical, with the capillaries having a constant cross-section at the closed ends, which then decreases closer to the open ends to the value at which the micro-capillaries become flexible to form a flexible gas pipeline.

The multi-capillary structure of any of the above embodiments is different in that the micro-capillaries are made of glass, of quartz, or of basalt.

The multi-capillary structure according to any one of the above-described variants is characterized in that a metal alloy having a low melting point and high adhesion to the micro-capillary material is selected as the material of the metal plugs.

The multi-capillary structure of any of the above embodiments is different by the fact that indium-tin alloy was chosen as the material of the plugs.

Multi-capillary structure according to any of the above options, characterized in that the length of the plug L is determined by the formula:

$$L > Pr/2k$$

where r is the internal diameter of the capillary, k is the adhesion force of the alloy with a unit of the glass surface, P is the required gas pressure inside the capillary.

According to anyone of the above-described variants, the multi-capillary structure is characterized in that the ratio of the wall thickness to the radius of micro-capillaries in the area of constant cross section should be from 0.1% to 10%.

According to anyone of the above-described variants, the multi-capillary structure is characterized in that the ratio of the wall thickness to the radius of micro-capillaries in the area of constant cross section should be from 0.1% to 2%.

The multi-capillary structure of any of the above embodiments is different that epoxy resin or epoxy glue is used as a plastic material.

The present invention is a device for storing and for transporting compressed hydrogen gas to fuel cells comprising one or more multi-capillary units containing hydrogen gas, a flexible multi-capillary gas pipeline integrated with multi-capillary units for transporting stored hydrogen to the fuel cell, and a hydrogen inlet and exhaust control system including pressure sensors and valves.

According to one of the options, the device includes a hexagonal multi-capillary structure consisting of a set of tightly packed cylindrical glass micro-capillaries, one end of which is sealed with metal plugs. The main difference from analogs is that the space between the cylindrical micro-capillaries is filled with epoxy resin or other plastic material, which ensures the monolithic structure, prevents diffusion of hydrogen through the walls of the capillaries into the surrounding medium and increases the strength of the capillaries due to the filling of nanometer-size cracks on the outer surface of the capillaries.

In another embodiment, the multi-capillary structure consists of tightly welded hexagonal prismatic (hexagonal) capillaries. However, unlike analogs, the external capillaries have a special shape, such that the segments of a cylindrical surface replace the planar faces of the prisms. This leads to the fact that when loaded with internal gas pressure, the outer surface of the multi-capillary structure undergoes stretching rather than bending, as opposed to the case of flat faces, where cascade destruction of the structure may occur at high gas pressures.

The plugs are made of a low-melting alloy with high adhesion to glass, preferably an indium-tin alloy, with the length of the plugs being proportional to the diameter of the micro-capillaries and inversely proportional to the degree of the adhesion.

The main difference from the analogs is the shape of the multi-capillary structure. A multi-capillary structure has a constant cross-section at a certain length, which then decreases sharply to the value at which the multi-capillaries become quite flexible. The area of flexibility of multi-capillaries is the length required for transporting hydrogen to the fuel cell. This creates a flexible multi-capillary gas pipeline integrated with the stored hydrogen volume, which serves to supply hydrogen to the fuel cell. A flexible multi-capillary gas pipeline may have an outer jacket protecting it from external mechanical impact. A hydrogen storage of sufficient volume and arbitrary shape is created from several multi-capillary structures by combining them with epoxy resin. The storage may have an outer shell of a lightweight porous polymer that protects it from impact. The device as a whole also includes an adjustable discharge valve, connected to the end of a flexible multi-capillary gas pipeline.

It should be noted that the device according to the present invention can also be used for the storage and release of gases other than hydrogen, for example methane, oxygen, helium, a mixture of hydrogen and methane, a mixture of oxygen and helium, and other gases, as well as mixtures thereof.

The above features and advantages of the present invention, as well as methods for achieving them, will become more clear and understandable based on the further description of embodiments of the invention with reference to the drawings.

BRIEF DESCRIPTION OF THE DRAWINGS

FIG. 5—possible structure of a multi-capillary gas cable. In the drawings, the numbers denote the following elements:
1. Micro-capillaries
2. Plastic material
3. Capillary plugs
4. Outer surfaces of the capillaries
5. Multi-capillary blocks
6. Parts of the gas pipeline
7. Gas pipeline
8. Pressure reducer
9. Buffer volume for hydrogen at reduced pressure
10. Fuel cells
11. Multi-capillary pipeline carrier
12. Polyethylene sheath
13. Winding of Kevlar or carbon fiber
14. Shockproof pipeline sheath

DESCRIPTION OF NON-LIMITING EMBODIMENTS

Figure 1:
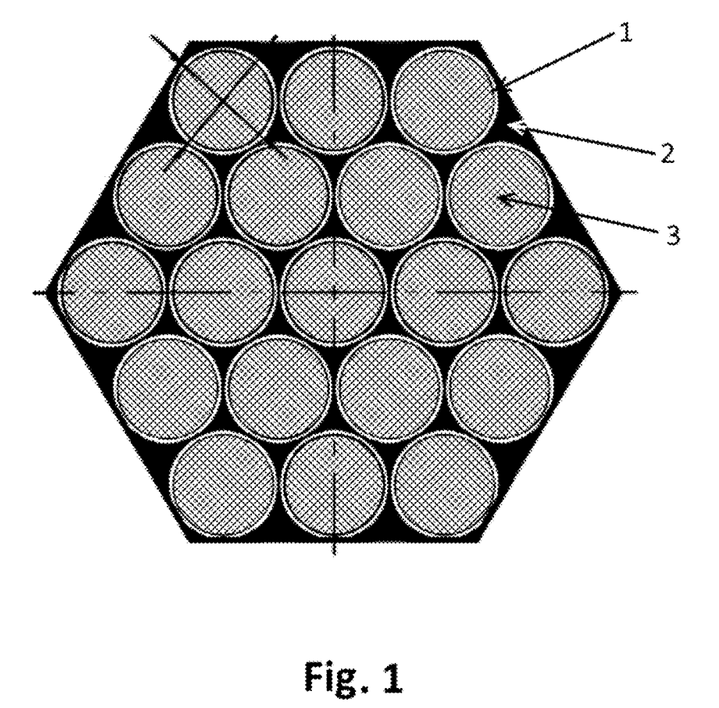
FIG. 1—the cross section of the structure of densely packed cylindrical glass micro-capillaries within the gas storage area.

FIG. 1 shows the schematic cross section of the first embodiment multi-capillary unit for the storage and transportation of hydrogen to the fuel cell. The structure consists of a set of identical cylindrical thin-wall glass micro-capillaries (1), tightly packed into a hexagonal or other matrix, closed from the ends with metal plugs (3) with sufficiently low melting point of the metal, having sufficiently good adhesion to glass and chemical resistance to hydrogen, such as indium-tin alloy In50Sn. After cooling the melt inside the capillaries below the melting point, a solid metal plug (3) is formed. The length of the plug L is determined from the condition of exceeding the adhesive force of the plug with the inner surface of the capillary above the force that pushes the plug out if the capillary is filled with gas with pressure P.

According to calculations, the length of the tube L must satisfy the condition:

$$L > Pr/(2k)$$

Here r is the internal diameter of the capillary, k is the adhesion force of the alloy with a unit of the glass surface.

The material of the capillaries (1) can be various types of glass, quartz or basalt. Multi-capillaries can be drawn from the corresponding preforms by softening them at elevated temperatures without subsequent crystallization. To minimize the probability of occurrence of nanometer-size cracks with a critical depth on the surface of micro-capillaries their wall thickness should preferably be less than 10 microns, more preferably less than 2 microns.

To minimize the weight of the micro-capillary system, the ratio of the wall thickness to the radius of the micro-capillaries should preferably be from 0.1% to 10%, more preferably from 0.1% to 2%.

The space between micro-capillaries (1) is filled with plastic material (2), for example, epoxy glue, epoxy resin (for example, glue Colltech CT 1010), the liquid monomer phase of which has a low enough viscosity and is able to easily fill the space inside and between the micro-capillaries. It should be noted that other glue with similar characteristics can be used as well. Since the lifting height of the monomer (the liquid phase of the plastic material) due to capillary forces is inversely proportional to the diameter of the channel, the monomer penetrates into the inter-capillary space to a depth greater than that for the capillary themselves.

The polymerization of the monomeric phase of the adhesive occurs under the influence of ultraviolet radiation or heat. After the polymerization, the closed ends of the capillaries must be cut staying the inter-capillary space closed. Filling the inter-capillary space with a plastic material (2) provides a monolithic structure, prevents the diffusion of hydrogen through the walls of capillaries into the environment and increases the strength of capillaries due to the covering of possible nanometer-size cracks on the outer surface of capillaries. To create the plugs (3) the open ends of the micro-capillaries are immersed into the melted metal alloy and some rarefaction inside the capillaries is created with a pump.

Figure 2:
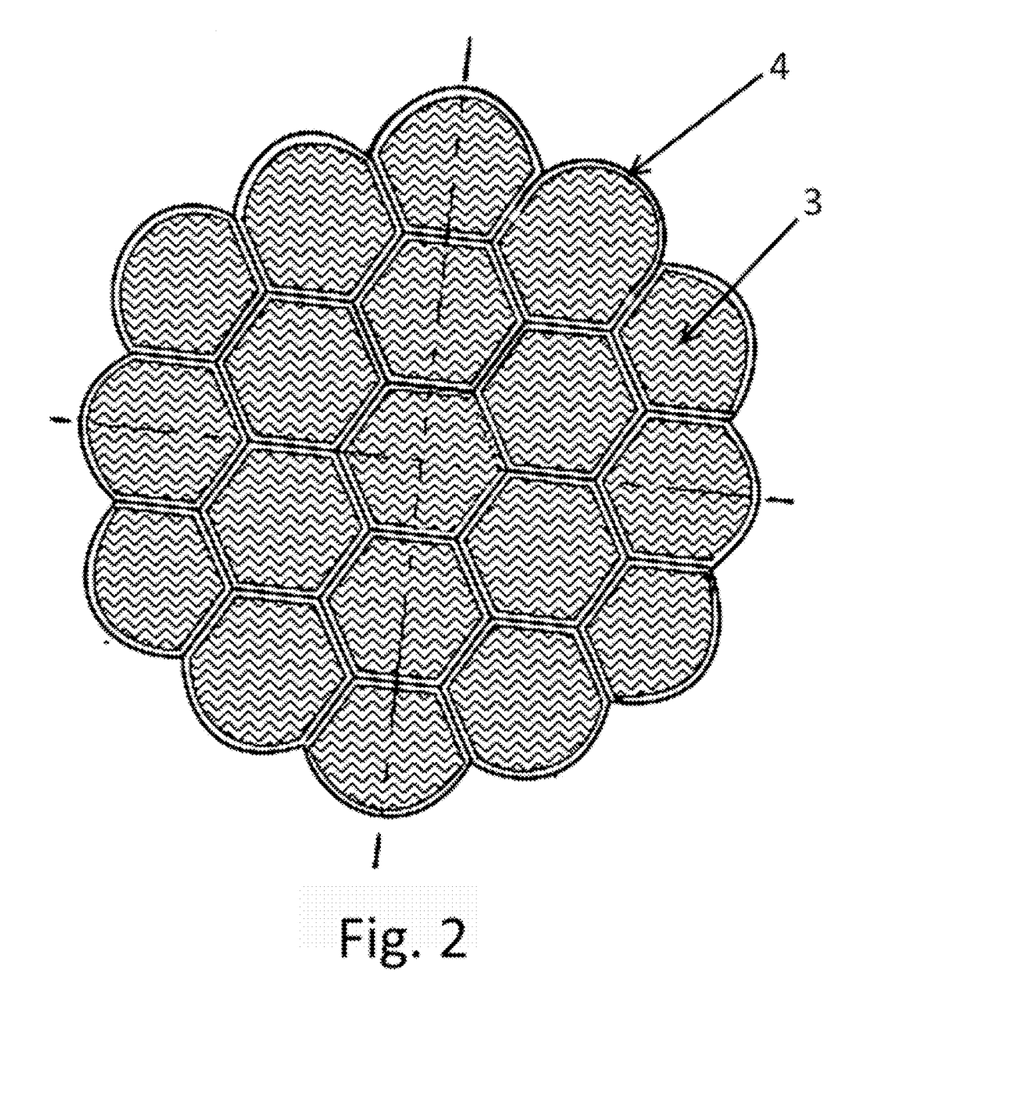
FIG. 2—view of the structure of tightly welded hexagonal prismatic (hexagonal) capillaries from the closed ends of the capillaries.

The second embodiment is shown schematically in FIG. 2. In this case internal micro-capillaries (1) have the shape of hexagonal prisms with common faces, forming a honeycomb structure in cross section, and the outer micro-capillaries have a special shape, where instead of flat faces they have cylindrical faces (4) on the outer surface and therefore do not experience bending deformation when the structure is under the internal gas pressure that may be critical for the glass strength. The corresponding shape of the outer capillaries can be obtained, for example, from flat edges, if the multi-capillary structure of fully hexagonal prisms is first soldered at both ends and then heated. Arising internal pressure due to the air expansion inside the capillaries deforms the faces of the outer capillaries as necessary, if the viscosity of glass is low enough. To create the plugs (3), the initially open end of the micro-capillaries is immersed in the melted metal alloy and some rarefaction inside the capillaries is created using a pump.

Figure 3:
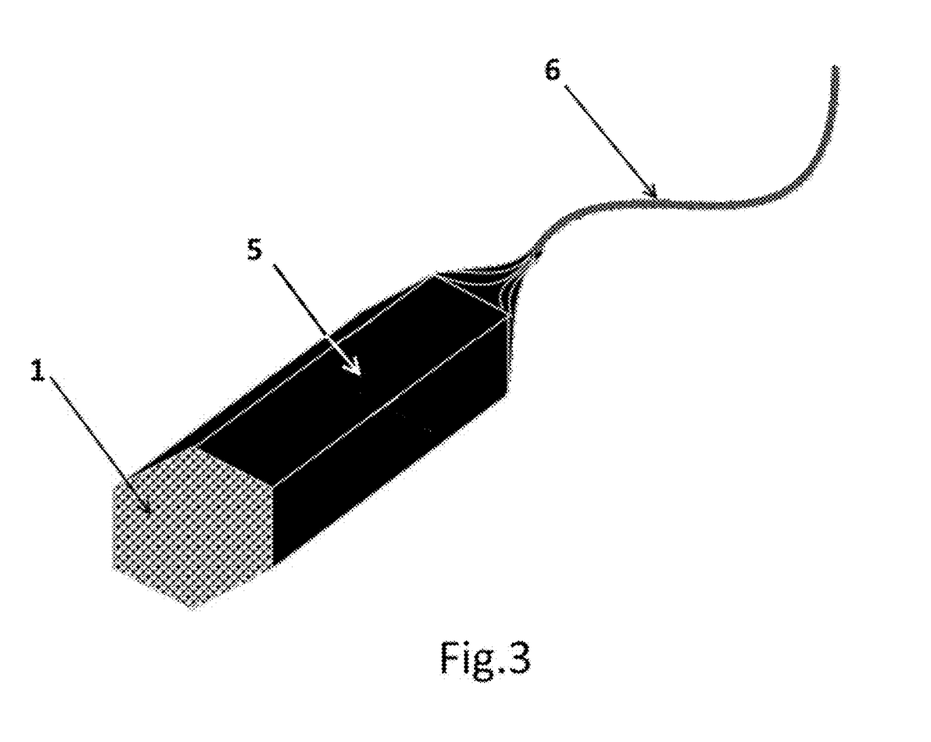
FIG. 3—the form of a multi-capillary structure in which the gas storage area goes into a flexible multi-capillary gas pipeline.

A general view of the hexagonal multi-capillary block is shown schematically in FIG. 3. Multi-capillary block (5) may contain from several tens to several hundred thousand micro-capillaries (1) and have a cross-sectional area in the gas storage area from several square millimeters to several tens of square centimeters. The shape of the block is not limited to the hexagon and may have a different geometric shape, for example, the shape of a parallelepiped or another shape, allowing the subsequent close packing of blocks in a micro-capillary system. In the area of gas transportation (6), the transverse dimensions of the block should provide sufficient flexibility for multi-capillaries (1), preferably these are transverse dimensions below 300 microns. The flexible ends of the micro-capillary block (5) can be obtained, for example, by heating multi-capillaries (1) to a temperature when the viscosity is glass is reduced to a value at which the waist of the block becomes possible. Such a procedure is used, for example, when creating glass multi-capillary structures with a variable cross section for X-ray optics in TOSS LLC (http://www.tegs.ru/?p=261). When hauling, the internal structure of the multi-capillary (1) is scaled to a smaller size, preserving its geometry.

Figure 4:
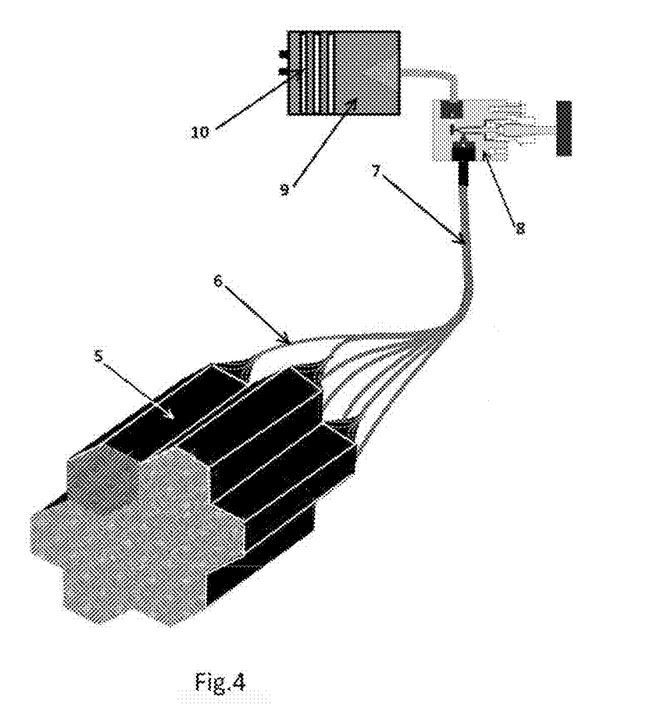
FIG. 4—one of the possible schemes for combining multi-capillary structures into a single gas storage of arbitrary shape.

A micro-capillary system for mobile storage of fuel gases and their transportation to fuel cells is schematically shown in FIG. 4. Such a system can be obtained by sintering or gluing (or another similar operation) several blocks (5) into a structure of arbitrary shape, while the flexible ends (6) of multi-capillaries are combined into a multi-capillary cable (7). Cable end (7) is connected, for example, with epoxy glue to the inlet of a control valve of high pressure (pressure regulator) (8). The output of the gearbox (8) is connected to the buffer volume (collector) (9), where the gas pressure is maintained at the level required for normal operation of the fuel cell (10). For example, if the hydrogen pressure in the micro-capillary system can reach 100 MPa, then in the buffer volume it should be reduced to 0.1-0.5 MPa. As a reducer (8), any known high-pressure valve can be used, for example, the well-known BuTech 316SS valve, designed to work with hydrogen at an inlet pressure of up to 100 MPa.

Figure 5:
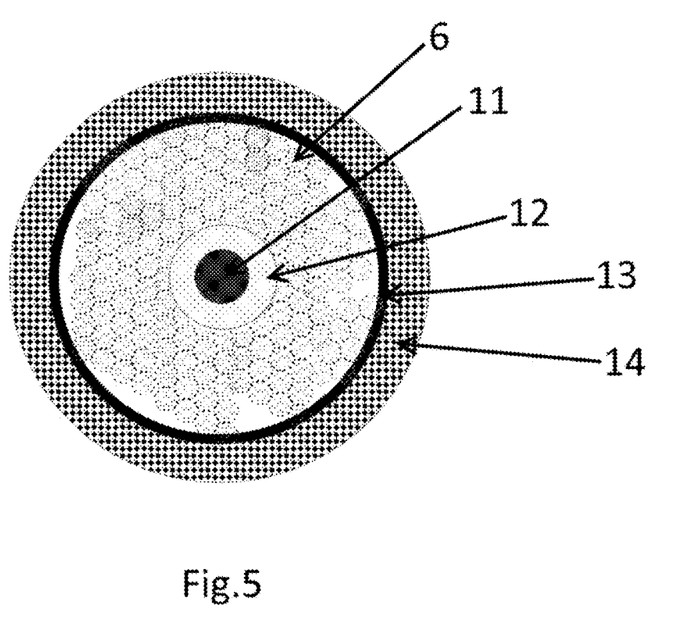

The cross-section of the multi-capillary pipeline is illustrated schematically in FIG. 5. The multi-capillary pipeline (7) may have a supporting cable made of fiberglass or metal (11), preferably covered with a polyethylene sheath (12), which serves to center individual gas pipelines (6), impart mechanical rigidity to the cable (7) and to secure the cable in the coupling gearbox (8). The cable may be covered with a layer of aramid or carbon filaments (13) and/or a soft sheath (14), for example, from polyurethane foam, to protect against accidental external damage during its installation from multi-capillary blocks to the buffer volume.

INDUSTRIAL APPLICABILITY

The invention can be implemented on the basis of the present description. Everything the necessary means and methods are disclosed in the description or are known to the person skilled in the art.

It should also be understood that the graphics presented in this application are for illustrative purposes only and are not intended in order to be limiting. It should be noted that the drawings illustrating various examples of the device according to the present invention are given for clarity without respecting the scale and proportions. It should also be noted that the blocks and other elements in these figures are exclusively functional units, so that the functional relationships between by these units, and not by any physical connections and/or physical interactions. You can add that the invention can be implemented in the framework of the claimed formula and other options other than those described which would be obvious to a person skilled in this technical field.

The invention claimed is:

1. Multicapillary gas storage system, comprising: a bundle of microcapillaries, closed at one end and characterized in that the microcapillaries are sealed with metal plugs, a space between the microcapillaries filled with polymer material, and the microcapillaries themselves are cylindrical in shape and have a constant cross-section at the closed ends, which then decreases closer to open ends to a value at which the microcapillaries become flexible to form a flexible gas pipeline.

2. The multicapillary gas storage system as claimed in claim 1, wherein the microcapillaries are made of glass, or of quartz, or of basalt.

3. The multicapillary gas storage system as claimed in claim 1, wherein a material of the metal plugs is a metal alloy having a low melting point and high adhesion to material of the microcapillaries.

4. The multicapillary gas storage system as claimed in claim 3, wherein indium-tin alloy is the material of the metal plugs.

5. The multicapillary gas storage system as claimed in claim 1, wherein a length of a metal plug L is determined by the formula:

$$L > \frac{P*r}{2*k}$$

where r is an internal diameter of a microcapillary, k is an adhesion force of the an alloy with a unit of a glass surface, and P is a required gas pressure inside the microcapillary.

6. The multicapillary gas storage system as claimed in claim 1, wherein a ratio of wall thickness to a radius of the microcapillaries at any capillary cross section ranges from 0.1% to 10%.

7. The multicapillary gas storage system as claimed in claim 6, wherein the ratio of wall thickness to the radius of the microcapillaries at any capillary cross section ranges from 0.1% to 2%.

8. The multicapillary gas storage system as claimed in claim 1, characterized in that epoxy resin or epoxy glue is used as the polymer material.

* * * * *